United States Patent
Neitzell et al.

(10) Patent No.: US 10,823,561 B2
(45) Date of Patent: *Nov. 3, 2020

(54) VIAL WITH IMPROVED VISIBILITY FOR LEVEL

(71) Applicant: Milwaukee Electric Tool Corporation, Brookfield, WI (US)

(72) Inventors: Roger D. Neitzell, Pewaukee, WI (US); Daniel L. Block, West Allis, WI (US); John Christianson, Waukesha, WI (US); Richard J. LaSota, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,555

(22) Filed: Aug. 10, 2018

(65) Prior Publication Data

US 2018/0347977 A1    Dec. 6, 2018

Related U.S. Application Data

(63) Continuation of application No. PCT/US2017/017008, filed on Feb. 8, 2017.
(Continued)

(51) Int. Cl.
*G01C 9/32* (2006.01)
*G01C 9/24* (2006.01)
(Continued)

(52) U.S. Cl.
CPC ............ *G01C 9/32* (2013.01); *G01C 9/02* (2013.01); *G01C 9/10* (2013.01); *G01C 9/24* (2013.01);
(Continued)

(58) Field of Classification Search
CPC ....................................................... G01C 9/32
(Continued)

(56) References Cited

U.S. PATENT DOCUMENTS

| 674,107 | A | * | 5/1901 | Traut | G01C 9/28 |
| | | | | | 33/379 |
| 3,583,073 | A | * | 6/1971 | Balint | G01C 9/34 |
| | | | | | 33/379 |

(Continued)

FOREIGN PATENT DOCUMENTS

| DE | 19716781 | 10/1998 |
| JP | 10-281763 | 10/1998 |

(Continued)

OTHER PUBLICATIONS

International Search Report and Written Opinion for International Application No. PCT/US2017/017008 dated May 18, 2017, 18 pages.

*Primary Examiner* — Christopher W Fulton
(74) *Attorney, Agent, or Firm* — Reinhart Boerner Van Deuren s.c.

(57) ABSTRACT

A level including level vial(s) having enhanced visibility are provided. The level may include a level vial including a material that is attracted to the interface or border of a globule within the level vial which improves visibility of the interface. The level may include a solid level indicator having easy to see end surfaces that are generally vertically oriented when in the level position. The end surfaces of the solid level indicator may allow the user to more easily compare the position of the solid level indicator to indicating lines formed on the level vial. The level may include a level vial including a first liquid and an immiscible second liquid forming a globule with the first material. The globule formed from the second material may improve visibility compared to a typical air bubble.

10 Claims, 9 Drawing Sheets

Related U.S. Application Data

(60) Provisional application No. 62/316,272, filed on Mar. 31, 2016, provisional application No. 62/295,896, filed on Feb. 16, 2016.

(51) Int. Cl.
*G01C 9/02* (2006.01)
*G01C 9/10* (2006.01)

(52) U.S. Cl.
CPC . *G01C 2009/102* (2013.01); *G01C 2009/107* (2013.01)

(58) Field of Classification Search
USPC .......................................................... 33/379
See application file for complete search history.

(56) References Cited

U.S. PATENT DOCUMENTS

| | | | | |
|---|---|---|---|---|
| 4,096,638 A | | 6/1978 | Schimming | |
| 4,647,767 A | * | 3/1987 | Jubinski | G01C 9/06 250/227.25 |
| 5,020,232 A | * | 6/1991 | Whiteford | G01C 9/32 33/348.2 |
| 10,001,371 B2 | * | 6/2018 | Neitzell | G01C 9/36 |
| 2004/0088873 A1 | * | 5/2004 | Lang | G01C 9/26 33/379 |
| 2005/0229413 A1 | * | 10/2005 | Foran | G01C 9/32 33/379 |
| 2006/0037204 A1 | * | 2/2006 | Gruetzmacher | G01C 9/32 33/379 |
| 2006/0117586 A1 | * | 6/2006 | Lang | G01C 9/20 33/379 |
| 2009/0139102 A1 | | 6/2009 | Kallabis | |
| 2011/0162222 A1 | * | 7/2011 | Ben-Josef | G01C 9/32 33/379 |
| 2011/0265339 A1 | * | 11/2011 | Allemand | G01C 9/32 33/366.23 |
| 2014/0259712 A1 | | 9/2014 | Takahashi | |
| 2016/0138916 A1 | * | 5/2016 | Neitzell | G01C 9/36 33/381 |

FOREIGN PATENT DOCUMENTS

| | | |
|---|---|---|
| JP | 2006-047093 | 2/2006 |
| WO | WO 2008/107868 | 9/2008 |

* cited by examiner

VIAL WITH IMPROVED VISIBILITY FOR LEVEL

CROSS-REFERENCE TO RELATED PATENT APPLICATIONS

This application is a continuation of International Application No. PCT/US2017/017008 filed Feb. 8, 2017, which claims the benefit of and priority to U.S. Provisional Application No. 62/295,896, filed on Feb. 16, 2016, and U.S. Provisional Application No. 62/316,272, filed on Mar. 31, 2016, which are incorporated herein by reference in their entireties.

BACKGROUND OF THE INVENTION

The present invention relates to vials for levels, and more particularly to vials with improved visibility.

SUMMARY OF THE INVENTION

In one construction, a vial includes a first fluid and a second fluid that acts as an indicator bubble. The first fluid and the second fluid being immiscible. The indicator bubble further includes a third material that is attracted to the exterior of the second fluid, thereby accentuating the edges of the indicator bubble to improve visibility of the indicator bubble.

In another construction, a flat vial includes a T-shaped cavity forming the vial interior to provide improved visibility of an indicator bubble when viewed from the top side and the vertical sides.

In yet another construction, an annular vial includes an annular cavity with a variable cross-sectional area. The annular recess having a first portion with a first cross-sectional area and a second portion with a second cross-sectional area.

In still another construction, a vial includes a body that defines an interior cavity. The vial further includes a plurality of obstructions within the cavity that define a plurality of narrow passages. The narrow channels connect a first portion and a second portion of the cavity. The cavity contains a first fluid and a second fluid that is immiscible with the first fluid. The narrow channels cause increased displacement of the first fluid and second fluid as the vial is tilted, and thus provide increased visibility and accuracy of the vial.

In still yet another construction, a level including a vial assembly having a vial surround and a vial. The vial having a longitudinal axis and containing an indicator bubble suspended in a liquid. The vial surround having a base for supporting the vial. The base having a light-colored middle portion positioned between a pair of dark-colored outer portions, each of which extend transverse to the longitudinal axis. The indicator bubble reflects light from the dark-colored portions such that a perimeter of the indicator bubble is darkened so as to improve visibility of the indicator bubble within the liquid. The perimeter contrasts with the light-colored middle portion to further improve visibility of the indicator bubble.

In another embodiment, a level includes a level body defining a planar base surface configured to engage a workpiece. The level includes a vial supported by the level body and including an inner surface defining a cavity. The level includes a first material located within the cavity of the vial, and the first material is a liquid material. The level includes a second material located within the cavity of the vial, and the second material forms an indicator within the first material such that an interface is defined between the first and second materials. The level includes a third material located within the cavity of the vial. The third material has a property that attracts the third material to the interface between the first material and the second material.

In another embodiment, a level includes a level body defining a reference surface configured to engage a workpiece. The level includes a vial supported by the level body and including an inner surface defining a cavity. The level includes a solid indicator located within the cavity. The solid indicator includes a first surface located at a first end of the solid indicator and a second surface located at a second end of the solid indicator opposite the first surface. The solid indicator moves within the vial in response to changing angular positions of the level body, and the solid indicator is shaped such that the first surface and the second surface are oriented in a direction perpendicular to the reference surface is oriented in a horizontal direction.

In another embodiment, a level includes level includes a level body defining a reference surface configured to engage a workpiece. The level includes a vial supported by the level body and including an inner surface defining a cavity. The level includes a first liquid material located within the cavity of the vial. The level includes a second liquid material located within the cavity of the vial. The second material immiscible in the first material such that an indicating bubble is formed by the second material within the first material.

Other features and aspects of the invention will become apparent by consideration of the following detailed description and accompanying drawings.

Figure 1:
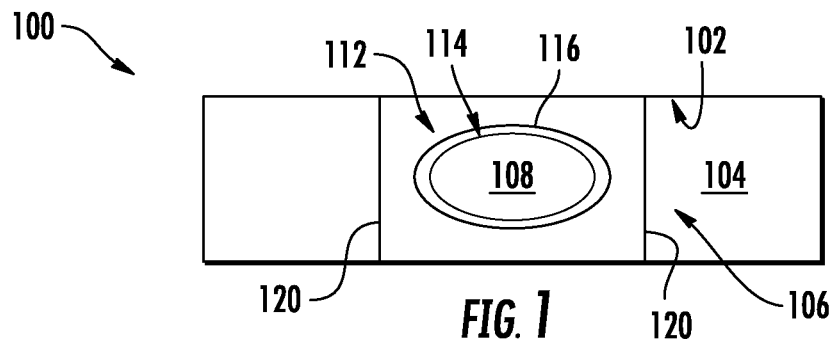
FIG. 1 is a side view illustrating a vial having a bubble with improved visibility.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-11 illustrate various vials having various constructions to increase visibility, accuracy and readability. FIG. 12 illustrates a level 10 including a level body 12 supporting a first vial, shown as level vial 14, and a second vial, shown as plumb vial 18. The vials of FIGS. 1-11 may be configured with the level 10 in place of the level vial 14, the plumb vial 18, or both. The vials of FIGS. 1-11 may be configured with the level 10 and corresponding base surface (s), shown as reference surfaces 22, of the level 10, such that the vials are oriented to determine if a surface is plumb (i.e., vertical), level (i.e., horizontal), or oriented at any other desired reference angle. The vials of FIGS. 1-11 may be formed from glass, a clear polymer (e.g., acrylic), or another suitable material. Alternatively, the vials may be configured with any other suitable tool, device, or structure.

FIG. 1 illustrates a vial 100 including an inner surface 102 that defines an interior cavity 106 that holds a first material, shown as first fluid 104 (e.g., alcohol, mineral spirit, etc.), and a second material, shown as a second fluid 108 (e.g., gas, air, liquid, etc.). The second fluid 108 is suspended in the first fluid 104 forming an indicator, shown as globule or bubble 112, to act as an inclination indicator. In various embodiments, where second fluid 108 is a gas or air, bubble 112 is a bubble containing the gas or air of second fluid 108 separated from first fluid 104. In other embodiments, the second fluid 108 is a liquid material, and the first fluid 104 and the second fluid 108 are immiscible relative to each other such that bubble 112 is a bubble containing the liquid of second fluid 108 separated from first fluid 104.

As shown in FIG. 1, the separation of first fluid 104 from second fluid 108 defines an interface 114 between the two different materials of fluids 104 and 108. In the embodiment shown in FIG. 1, to enhance visibility of bubble 112, vial 100 includes a third material 116 that has a property that attracts third material 116 to interface 114. As will be explained in more detail below, the property of third material 116 is one that differentially attracts third material 116 to interface 114 such that third material 116 tends to be located at interface 114 (or returns to interface 114 following disruption) rather than being dispersed within fluids 104 and 108.

In one embodiment, third material 116 is attracted to an exterior surface of the second fluid 108. In one embodiment, third material 116 is another fluid immiscible with the first and second fluids 104, 108. In another embodiment, third material 116 is a particulate material, and in other embodiments, third material 116 is any other suitable material that is attracted to the interface 114 (e.g., attracted to the second fluid 108 and not the first fluid 104, or alternatively repelled by the first fluid 104). The third material 116 may partially or entirely surround the bubble 112, and may have various thicknesses. As will be explained in more detail below, Applicant believes that use of third material 116 within vial 100 tends to enhance the visibility of interface 114 such that the location and position of bubble 112 is easier for a user to see when using a level incorporating vial 100.

In one exemplary embodiment, the differential property of the third material 116 that attracts it to interface 114 is density, and in this embodiment, the density of the third material 116 is less than the density of fluid 104 but is greater than the density of fluid 108. In this embodiment, the third material 116 tends to reach positional equilibrium at interface 114 between fluids 104 and 108. In one such embodiment, fluid 108 is an air or gas, and third material 116 floats on fluid 104 at interface 114.

In one exemplary embodiment, the differential property of the third material 116 that attracts it to interface 114 is polarity, and in this embodiment, the polarity of third material 116 is different from the polarity of fluids 104 and 108. In one such embodiment, fluid 104 may be a polar fluid, and fluid 108 is a nonpolar fluid. In another such embodiment, fluid 104 may be a nonpolar fluid, and fluid 108 is a polar fluid.

In another such embodiment, third material 116 is an amphipathic material (e.g., a material having a polar region and a nonpolar region). In one such embodiment, fluid 104 may be a polar fluid, and fluid 108 is a nonpolar fluid. In another such embodiment, fluid 104 may be a nonpolar fluid, and fluid 108 is a polar fluid. In such embodiments, third material 116 may form a layer or membrane with polar and nonpolar regions of the amphipathic material oriented based on the attraction of those regions to the polarity of fluids 104 and 108.

In some embodiments, third material 116 accentuates the peripheral boundaries of the bubble 112 to provide improved visibility of the bubble 112 within the vial 100, and improved readability of the position of the bubble 112 relative to a pair of indicator lines 120 of the vial 100. In one embodiment, the first fluid 104, the second fluid 108, and the third material 116 may be oil, water, and dish soap, respectively. In one embodiment, when the third material 116 becomes separated from the surface of the bubble 112 (e.g., by dropping the level, shaking, agitation, etc.), the third material 116 is configured to return to the surface of the bubble 112 in less than about 3 seconds, in another embodiment, in less than about 2 seconds, in another embodiment, in less than about 1 second, in another embodiment, in less than about 0.5 seconds. In a specific embodiment, when the third material 116 becomes separated from interface 114 via a drop to the ground from a horizontal position four feet above the ground, the third material 116 (e.g., at least 90% of third material 116) returns back to interface 114 in less than 3 seconds, specifically in less than 2 seconds, more specifically, in less than 1 second, and even more specifically in less than 0.5 seconds.

In one embodiment, third material 116 has a property that is different than a property of fluids 104 and 108 which accentuates, highlights or otherwise improves visibility of interface 114. In one embodiment, third material 116 has an optical property that is different than the same optical property of fluid 104 and/or of fluid 108. In such exemplary embodiments, third material 116 has a light transmittance, a light emittance, or index of refraction, that is different from the light transmittance, light emittance, or index of refraction, respectively, of fluid 104 and/or of fluid 108. In a specific embodiment, third material 116 has a light transmittance at a wavelength of between 390 nm to 700 nm that is greater than a light transmittance at the wavelength of the first fluid 104 and/or of second fluid 108.

In other embodiments, vial 100 may include first fluid 104 that is a first liquid and second fluid 108 that is a second liquid. In some such embodiments, vial 100 may not include third material 116, and visibility is enhanced simply by the nature of interface 114 formed between the two liquid materials of fluids 104 and 108. In such embodiments, bubble 112 is bubble of the liquid material of fluid 108 that separates from the liquid of fluid 104. In some such embodiments, the liquid of second fluid 108 may be less dense that fluid 104, may be more polar than fluid 104, less polar than fluid 104 and/or may be an amphipathic material. In one specific embodiment, fluid 108 may be an amphipathic material that arranges itself into a micelle arrangement within fluid 104.

Figure 2:
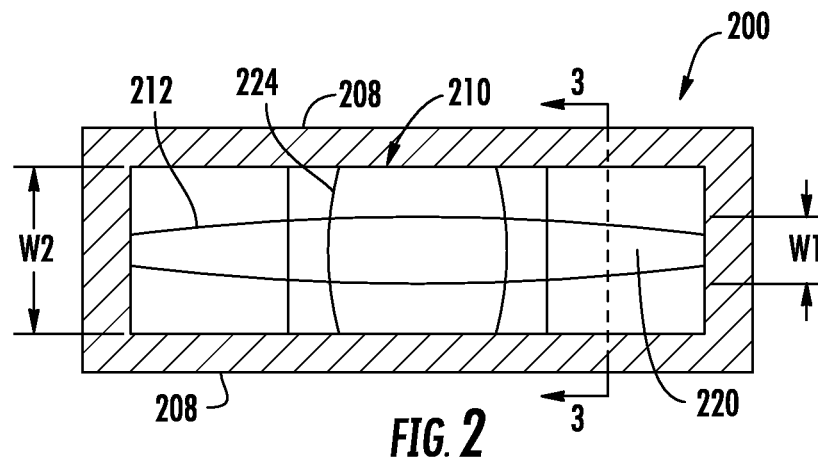
FIG. 2 is a top planar view illustrating a flat vial.
Figures 3, 4:
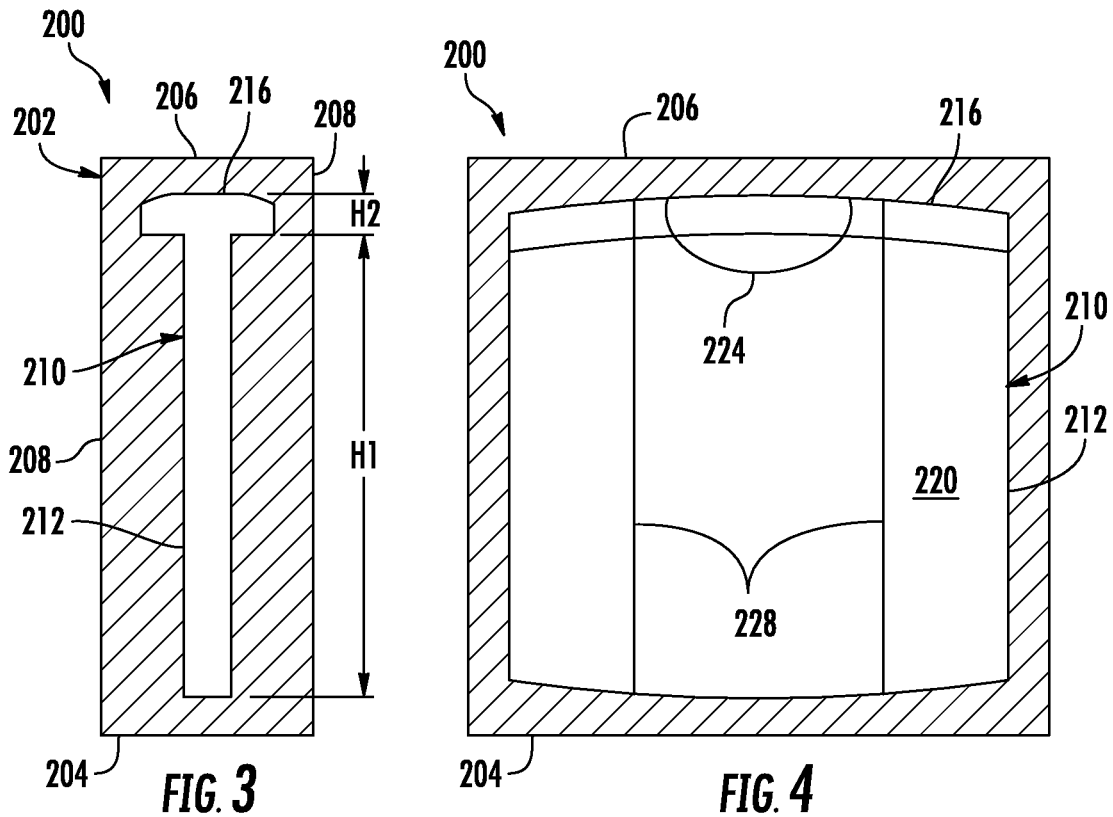
FIG. 3 is a cross-sectional view of the flat vial of FIG. 2 taken along line 3-3.
FIG. 4 is a side view of the flat vial of FIG. 2.

FIGS. 2-4 illustrate a flat vial 200 including a transparent elongated block 202. The block 202 has a bottom side 204, a top side 206 and a pair of vertical sides 208. The block 202 defines a T-shaped interior cavity 210, as shown in FIG. 3. In addition, the cavity 210 is filled with a first fluid 220 and an air bubble 224, or immiscible second fluid, to act as an inclination indicator. The T-shaped interior cavity 210 has a first, vertical portion 212 parallel with the vertical sides 208, and a second, horizontal portion 216 parallel with the top side 206. With reference to FIG. 2, the second portion 216 has a width W2 that is significantly wider than a width W1 of the first portion 212. In addition, with reference to FIG. 3, the second portion 216 has a height H2 significantly less than a height H1 of the first portion 212 (e.g., the height H2 of the second portion 216 may be less than 1/16th of an inch, i.e., less than approximately 1.5 mm). Thus, the visibility of the second portion 216 is minimized when viewing the bubble 224 from either of the vertical sides 208. In some embodiments, the third material 116 of the vial 100 of FIG. 1 may be used to provide further visibility of the bubble 224, as described above with respect to vial 100 of FIG. 1. The first portion 212 and the second portion 216 both have a concave or barrel shape so that the bubble 224 settles toward the center of the second portion 216 when the flat vial 200 is horizontal.

In use, the vial 200 of FIGS. 2-4 provides enhanced visibility by forcing the bubble 224 to appear larger in the views where it typically appears small. For example, from either of the vertical sides 208 (FIG. 4) the bubble 224 is seen extending horizontally across the first portion 212 of the cavity 210 providing for increased visibility of the bubble 224. When viewing the vial 200 from the top side 206 (FIG. 2) a portion of the bubble may be located in the second portion 216 such that the bubble 224 may be seen extending across the second portion 216 of the cavity 210, which may provide for increased visibility of the bubble 224 based on the greater dimension of the width W2 of the second portion 216 compared to that of the width W1 of the first portion 212 (i.e., compared to a flat vial without a second portion 216). Thus, the second portion 216 provides improved visibility of the bubble 224 and readability of the position of the bubble 224 relative to a pair of indicator lines 228, when viewing the bubble 224 from the top side 206, as shown in FIG. 2. Without the second portion 216 the bubble 224 would be as thin as the width W1 of the first portion 212. Thus, the bubble 224 would be difficult to see and read when viewing from the top side 206.

Figure 5:
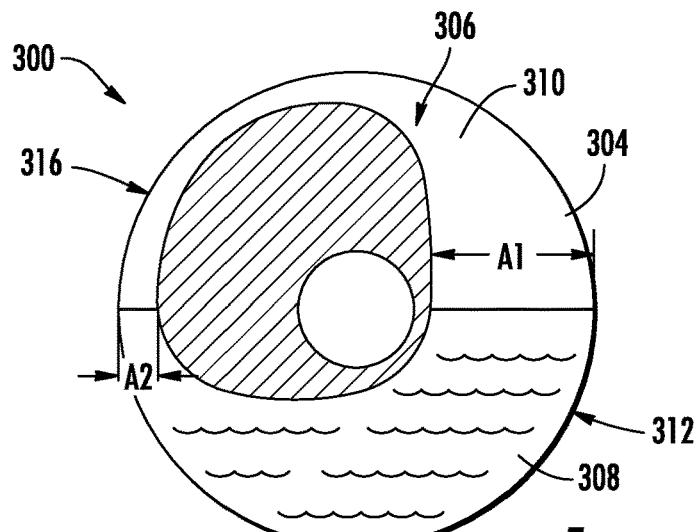
FIG. 5 is a side view illustrating an annular vial.
Figure 6:
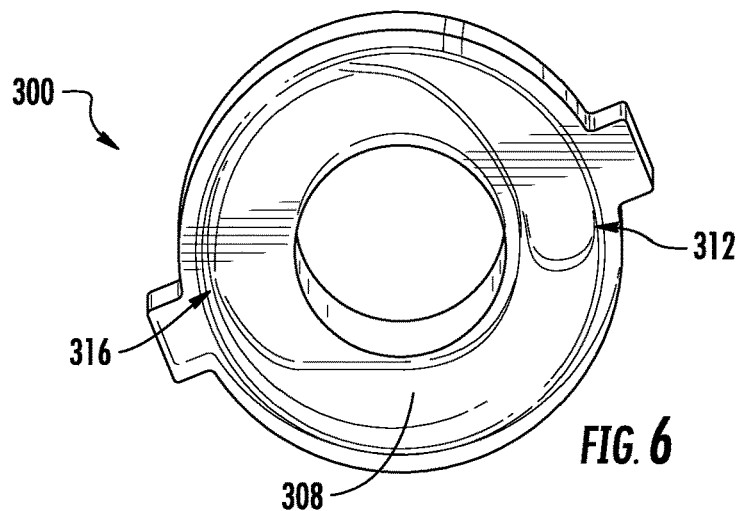
FIG. 6 is a side perspective view of the annular vial of FIG. 5 in a first position.
Figure 7:
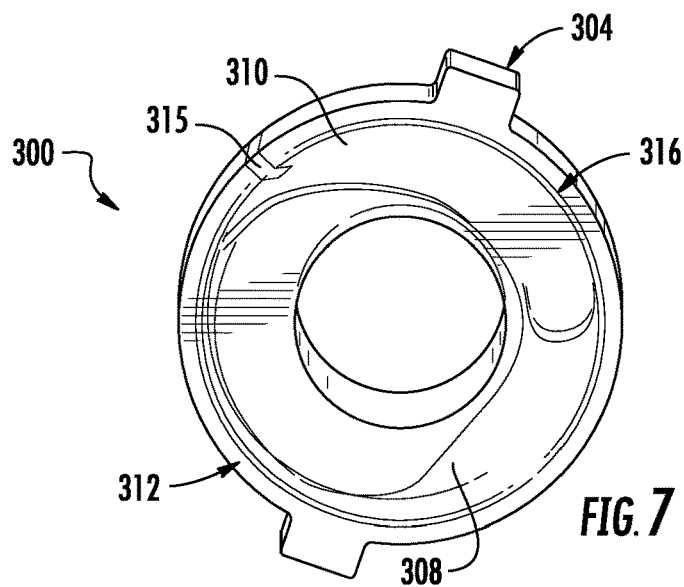
FIG. 7 is a side perspective view of the annular vial of FIG. 5 in a second position.

FIGS. 5-7 illustrate an annular vial 300 including a disc-shaped body 304. The body 304 defines an annular interior cavity 306 with a varying cross-sectional area. The interior cavity 306 contains a first fluid 308 and air 310, or alternatively a second fluid being immiscible with the first fluid 308. The interior cavity 306 has a first portion 312 and a second portion 316 opposite the first portion 312. The first portion 312 has a first width A1 defining a first cross-sectional area and the second portion 316 has a second width A2 defining a second cross-sectional area. The first width A1 is wider than the second width A2. Due to the depth (i.e., dimension perpendicular to FIG. 5) of the cavity 306 being uniform and to the first cross-sectional area being greater than the second cross-sectional area, the first portion 312 has a larger volume than the second portion 316.

Due to the difference in volume between the first portion 312 and the second portion 316, tilting the annular vial 300 from a first position, shown in FIG. 6, to a second position, shown in FIG. 7, displaces the fluid 308 from the first portion 312 to the second portion 316 causing a small change in the amount of fluid 308 that occupies the first portion 312 (as a function of the total amount of fluid in the first portion 312) while causing a large change in the amount of fluid 308 that occupies the second portion 316 (as a function of the total amount of fluid in the second portion 316), as shown in FIG. 7. In other words, a small change in the height or fluid level (i.e., area where the first fluid 308 and the air 310 are in contact) of the fluid 308 in the first portion 312 causes a large change in height of the fluid 308 in the second portion 316. Thus, small angular changes of the annular vial 300 have increased perceptibility and readability due to the large change in the height of the fluid in the second portion 316 of the cavity 306. As such, a surface can be more accurately measured for level or plumb using the annular vial 300. In some embodiments the depth (i.e., dimension perpendicular to FIG. 5) of the cavity may be larger in the first portion 312 than in the second portion 316 to provide an even larger difference in volume between the first portion 312 and the second portion 316 and cause a larger change in height of the fluid 308 in the second portion 316.

The annular vial 300 may include indicator marks 315 positioned circumferentially around the annular vial 300 that are calibrated with the amount of the fluid 308 within the cavity 306 to indicate when the vial 300 is level (i.e., horizontal). Alternatively, the indicator marks 315 may be located around the vial 300 on vial surrounds or a level supporting the vial 300. Additionally, because of the continuous annular cavity 306 the annular vial 300 may be used as both a level vial and a plumb vial to determine horizontal or vertical without the need to reorient the vial or use a separate vial.

Figure 8:
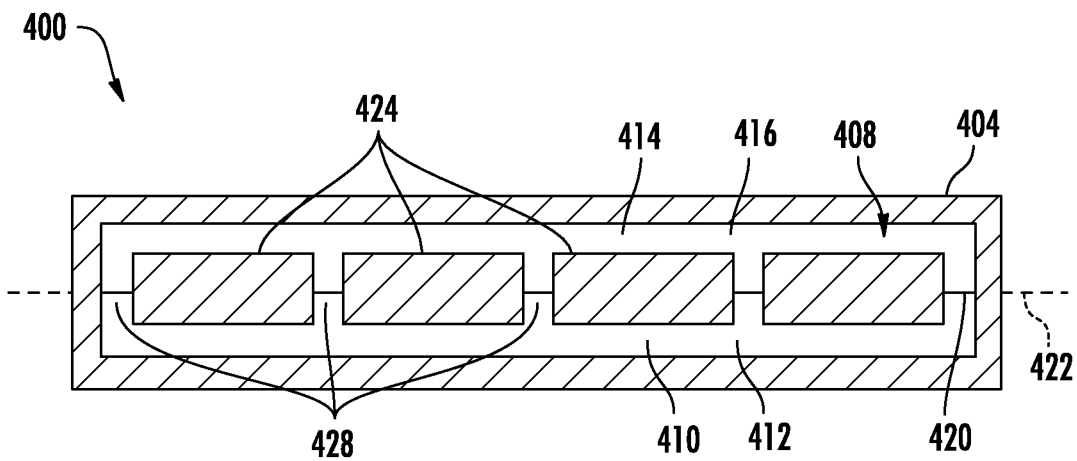
FIG. 8 is a cross-sectional side view of a vial in a horizontal position.
Figure 9:
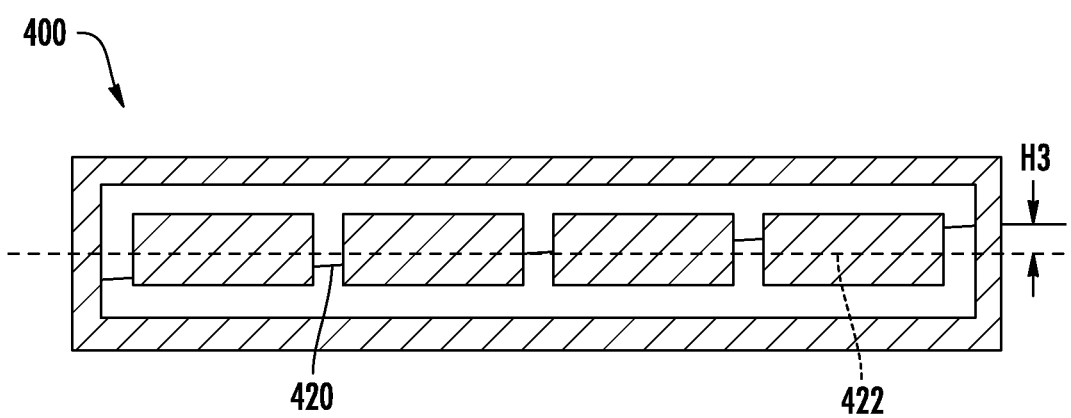
FIG. 9 is a cross-sectional side view of the vial of FIG. 8, illustrated in a tilted position relative to the horizontal position of FIG. 8.

FIGS. 8-9 illustrate a vial 400 including a body 404 defining an interior cavity 408. The interior cavity 408 has a first portion 410 that contains a first fluid 412 and a second portion 414 that contains air 416, or alternatively an immiscible second fluid, when the vial 400 is horizontal, as shown in FIG. 8. The first fluid 412 defines a fluid level 420. The vial 400 further includes a reference line 422 to indicate that the vial 400 is horizontal when the fluid level 420 is aligned or parallel with the reference line 422, as shown in FIG. 8. The vial further includes a plurality of spaced obstructions 424 that define a plurality of narrow channels 428 between the obstructions 424. The narrow channels 428 fluidly connect the first portion 410 and the second portion 414 of the cavity 408. The obstructions 424 reduce the cross-sectional area, and thus volume, between the first portion 410 and the second portion 414 to that of the narrow channels 428. Thus, as the vial 400 is tilted the first fluid 412 moves upwardly through the narrow channels 428 such that a height H3 between the fluid level 420 and the reference line 422 is increased, as shown in FIG. 9. Due to the narrow channels 428 the visibility of the fluid level 420 and readability of the vial 400 is increased. As such, a user can more readily and accurately determine if the fluid level 420 is aligned with the reference line 422, and therefore more accurately determine if a measured surface is level or plumb.

Figure 10:
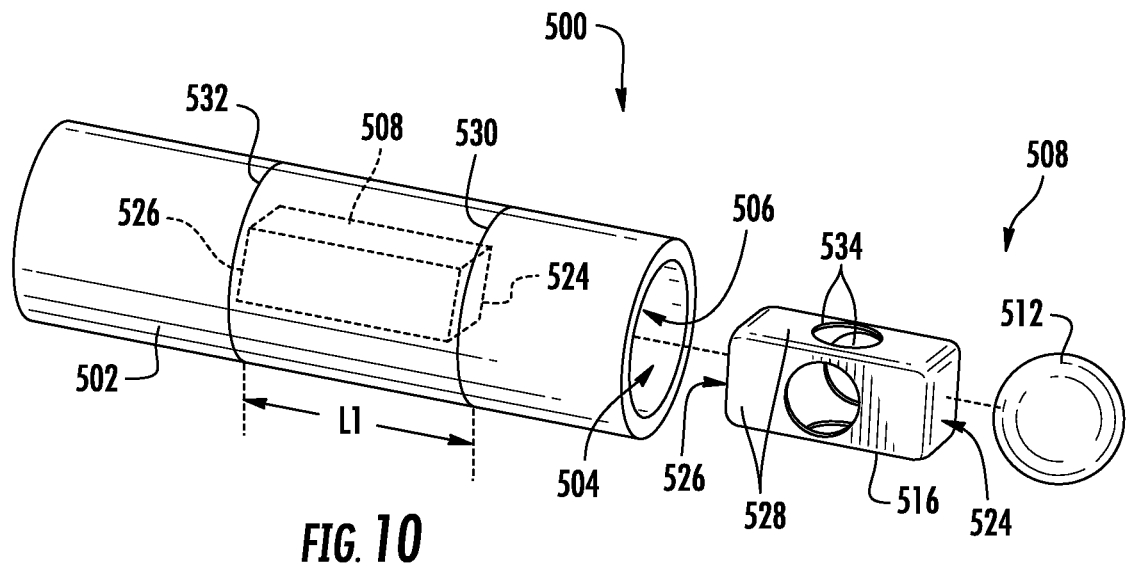
FIG. 10 is an exploded view of a vial including a solid indicator.
Figure 11:
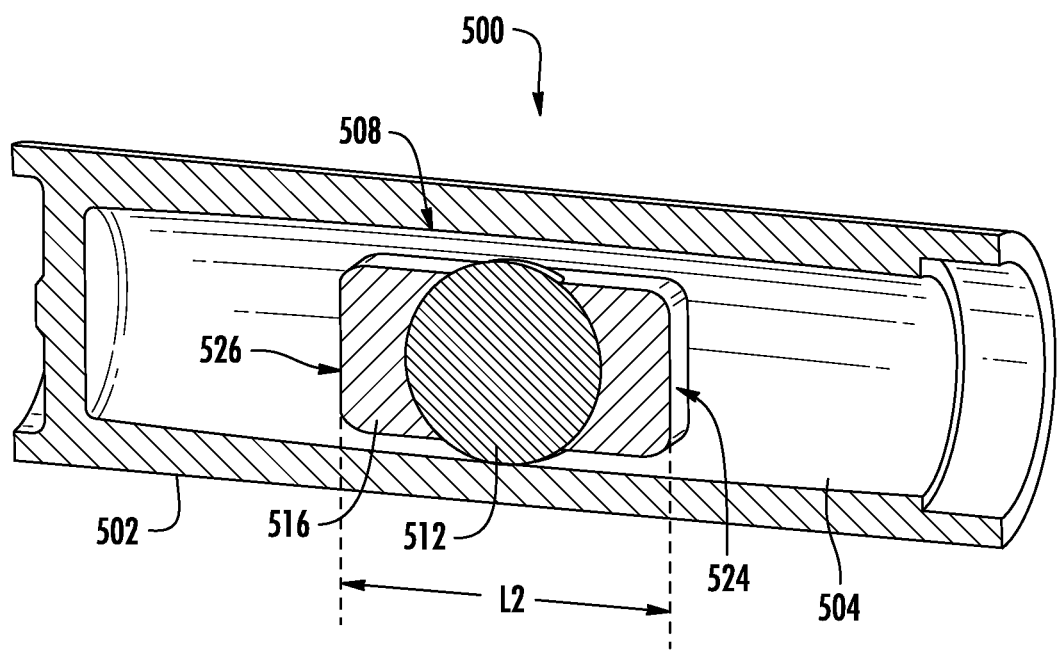
FIG. 11 is cross-sectional perspective view of the vial of FIG. 10.
Figure 12:
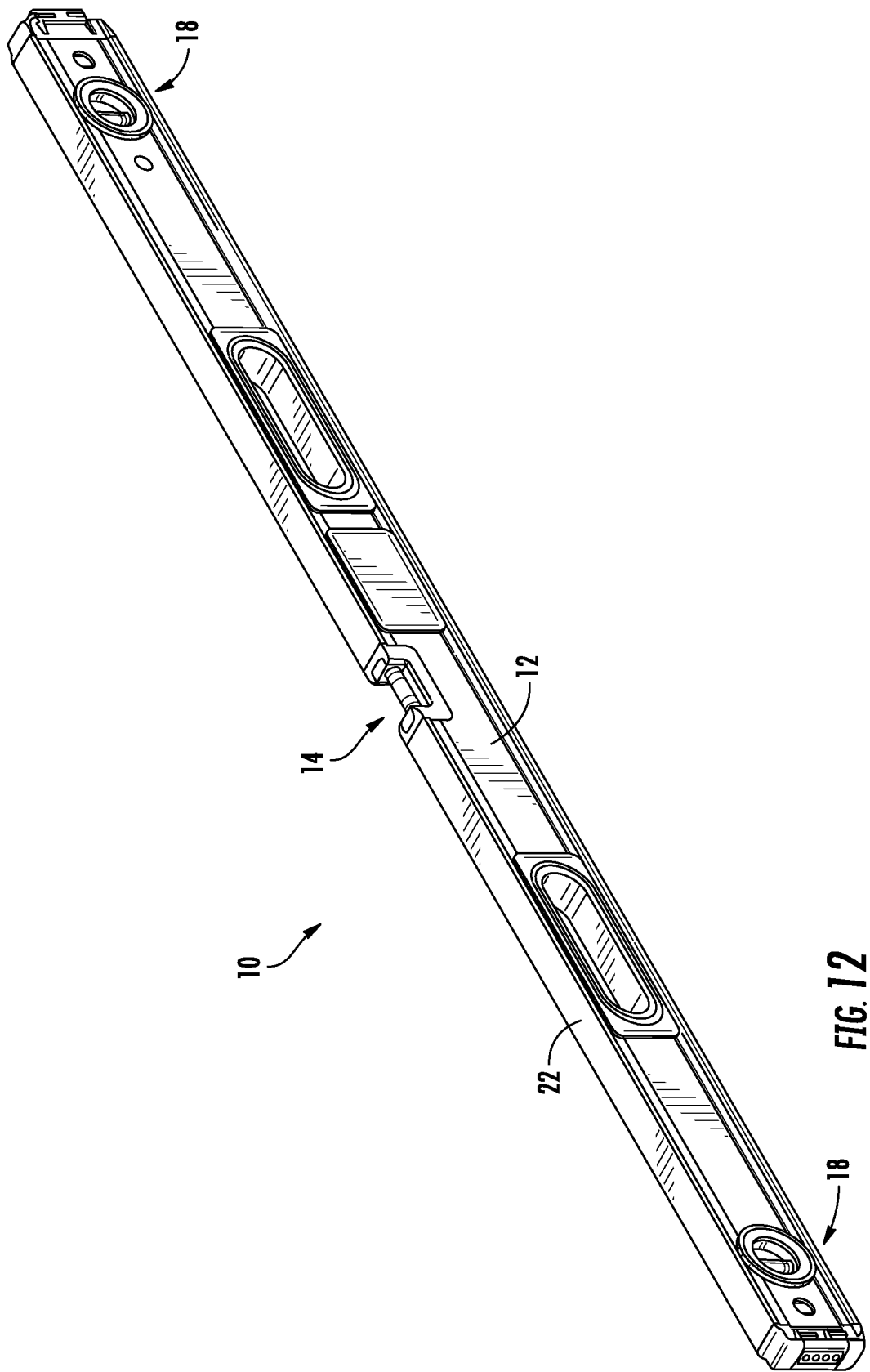
FIG. 12 is a perspective view of a level.

FIGS. 10-11 illustrate a vial 500 for a level tool 10 of FIG. 12. The vial 500 includes a transparent/translucent cylindrical body 502 having a cavity or an inner bore 504 defined by an inner surface 506 and includes a solid indicator 508 located within bore 504. In this embodiment, solid indicator 508 replaces the air bubble common to standard spirit level tools and is configured to move within bore 504 based on the angular position or inclination of level 10.

To provide inclination indication, solid indicator includes a first surface 524 located at a first end of solid indicator 508 and a second surface 526 located at a second end of solid indicator 508 that is opposite of first surface 524. As shown in FIG. 11, when the level body or the reference surface (see reference surface 22 in FIG. 12) is oriented in the horizontal direction, surfaces 524 and 526 are orientated in a direction perpendicular to the reference surface (i.e., vertically when reference surface is horizontal). In some embodiments, surfaces 524 and 526 are mirror images of each other, and in the particular embodiment shown, surfaces 524 and 526 are planar surfaces that are substantially parallel to each other (e.g., at an angle of less than 10 degrees relative to each other, specifically less than 1 degree relative to each other, etc.). In other embodiments, surfaces 524 and 526 may be non-planar surfaces (e.g., curved surfaces) and in such embodiments, the orientation of surfaces 524 and 526 relative to the reference surface 22 of level 10 noted above relates to orientation of a major or minor axis of the curved surfaces 524 and 526.

In general, visibility of inclination/level indication provided by vial 500 is enhanced by use of indicator 508 because Applicant believes that the visibility of surfaces 524 and 526 relative to indicator lines 530 and 532 is enhanced (at least as compared to some typical bubble/spirit vial designs). As shown in FIG. 10, indicator lines 530 and 532 are substantially parallel lines, and when vial 500 is indicating a high degree of levelness, indicator 508 is generally located between lines 530 and 532 such that surfaces 524 and 526 are positioned adjacent to or aligned with lines 530 and 532, respectively. This allows the user see that levelness is indicated by vial 500 by viewing the position of surfaces 524 and 526 relative to the position of indicator lines 530 and 532.

In specific embodiments, a length, L1, is defined between lines 530 and 532, and indicator 508 has a length, L2, defined between surfaces 524 and 526. As can be seen by FIG. 10, the alignment between surfaces 524 and 526 and lines 530 and 532 in the level position are based on the relative size of L2 to L1. In specific embodiments, L2 is between 75% and 125% of L1, specifically between 90% and 110% of L1 and more specifically between 99% and 101% of L1. In a specific embodiment, the horizontal distance between surfaces 524 and 526 and lines 530 and 532, respectively when in the horizontal position, is less than 2 mm.

In various embodiments, vial 500 is configured to contain a liquid, gas or vacuum within bore 504 surrounding indicator 508. In one embodiment, vial 500 is configured to hold a fluid (e.g., alcohol, mineral spirits, etc.), and solid "bubble" or indicator 508 suspended in the fluid. The solid indicator 508 includes a rolling element, shown as sphere 512 and a cuboid 516. In this embodiment, the cuboid 516 defines the pair of opposite end faces 524, 526 and four longitudinal faces 528 extending between the end faces 524, 526. Each of the longitudinal faces 528 defines a circular window 534. The sphere 512 is formed from a dense material (e.g., metal, hard plastic, etc.) and is preferably solid, with some embodiments employing a hollow sphere if desired.

As shown in FIG. 11, the sphere 512 is positioned within the cuboid 516 such that the sphere 512 protrudes partially out of the circular windows 534. The sphere 512 rotates freely within the cuboid 516 such that the sphere 512 can roll along an inner surface of the bore 504, thereby allowing the indicator 508 to move axially within the cylindrical body 502 of the vial 500. As the vial 500 is tilted with respect to the axis being measured the indicator 508 moves toward the lower end of the vial 500. The inner surface of the bore 504 has a concave or barrel shape that allows for the indicator 508 to settle toward the center of the bore 504 when the vial 500 is parallel to the axis being measured. In use, similar to levels that use air bubbles, a surface is indicated as level or plumb, when the indicator 508 falls between a pair of indicator marks or lines on the body 502. The end faces 524 are parallel with the indicator lines on the cylindrical body 502 of the vial 500. Thus, the distance between the end faces 524 and the corresponding indicator line may be easily determined, increasing readability in comparison to a sphere 512 or bubble. In addition, the color of the cuboid 520 and the material used to manufacture the cuboid 520 can be selected to assure that the cuboid 520 stands out and is easily visible in common or desired lighting circumstances. Therefore, the cuboid 520 provides increased visibility and accuracy to the indicator 508 within the vial 500.

FIGS. 13-17 illustrate a spirit level 600 including a frame body 604, an interior support structure or cartridge 608, and a center vial assembly 612 having a center vial 616. The frame body 604 is a box level-type frame having a top planar wall 620, a bottom planar wall 624 and a pair of parallel sidewalls 628 (only one is shown) connecting the top planar wall 620 and the bottom planar wall 624 to define an internal cavity running along a length of the level 600. A generally U-shaped frame cutout 632 is defined by the sidewalls 628 and the top planar wall 620. In alternate embodiments, the level 600 may be an I-beam level, a torpedo level, or any other type of level or device utilizing a spirit vial.

Figure 13:
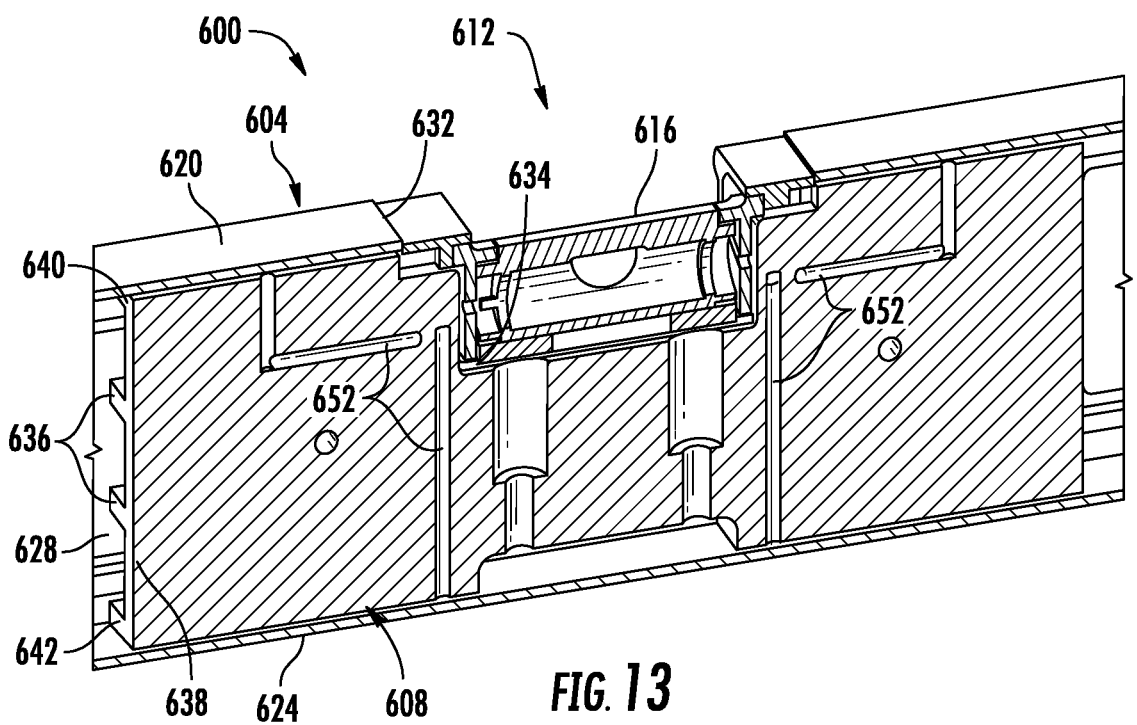
FIG. 13 is an enlarged cross-sectional perspective view of a portion of a level.

With reference to FIG. 13, the interior support structure 608 defines an interior support cutout 634. The interior support structure 608 has a plurality of flanges 636 that extend perpendicularly from a central web 638. The interior support structure 608 slides within the cavity through an open end (not shown) of the frame body 604 such that the central web 638 is parallel to the sidewalls 628 and is positioned such that the interior support cutout 634 aligns with the frame cutout 632 in the frame body 604. The flanges 636 include a top flange 640 adjacent the top planar wall 620 of the frame body 604, and a bottom flange 642 adjacent the bottom planar wall 624 of the frame body 604. The interior support structure 608 provides structural support and increased stiffness to the frame body 604 of the level 600 around the frame cutout 632 in the frame body 604. The interior support structure 608 is secured to the frame body 604 by adhesive (e.g., epoxy) injected through adhesive passageways 652 defined in the interior support structure 608. In addition to or in lieu of adhesive, the interior support structure 608 may be secured to the frame body 604 via fasteners or other securing means.

Figure 14:
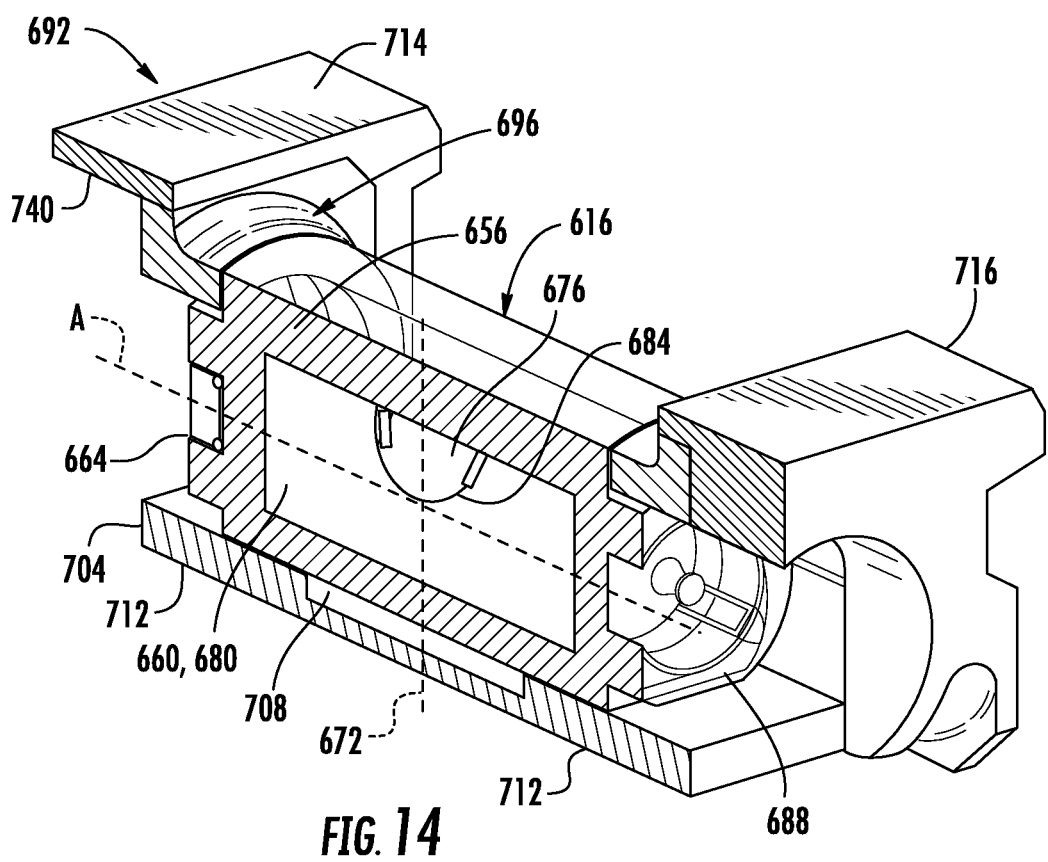
FIG. 14 is a cross-sectional perspective view of a vial assembly of the level of FIG. 13.
Figure 17:
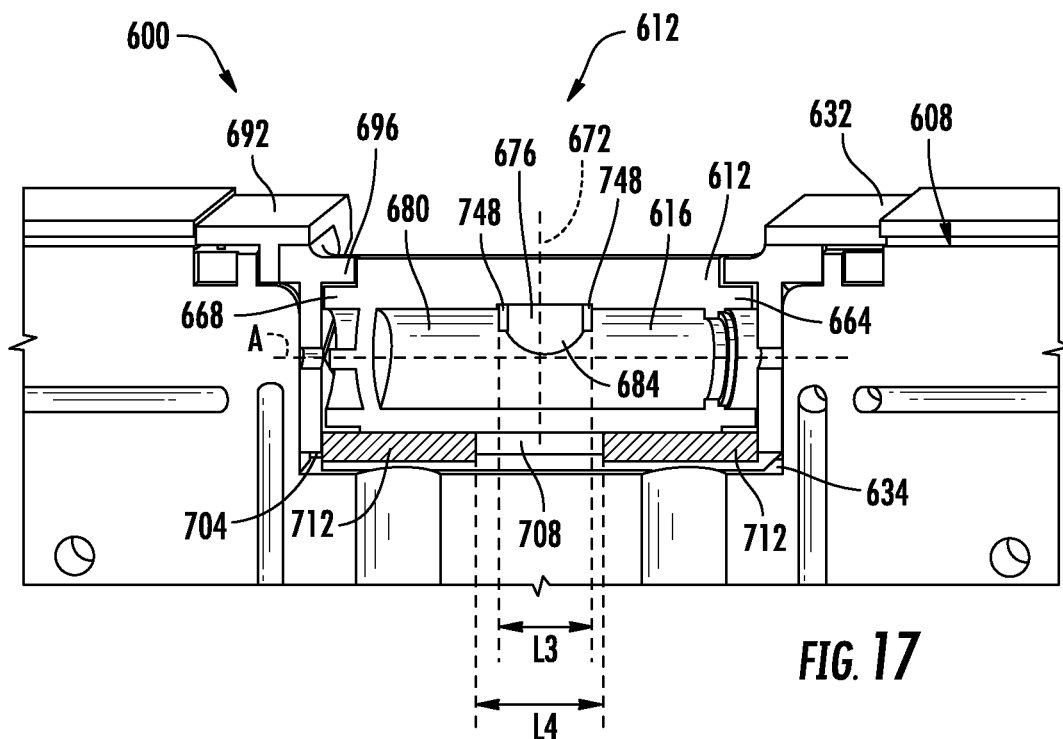
FIG. 17 is an enlarged cross-sectional side view of the level of FIG. 13.

With reference to FIGS. 14 and 17, the vial 616 includes a translucent vial body 656 having a cavity 660. The vial body 656 has first and second ends 664, 668 and a longitudinal axis A extending therebetween. The cavity 660 is barrel shaped such that the cavity 660 has a maximum diameter 672 defined at a center of the cavity 660 of the vial 616 along the longitudinal axis A. The cavity 660 contains an indicator bubble 676 formed of a first fluid and preferably a gas (e.g., air) and a second fluid preferably a liquid 680 (e.g., alcohol). The bubble 676 is suspended in the liquid 680 such that the bubble 676 is generally centered on the maximum diameter 672 when the vial is oriented parallel to true horizontal (i.e., perpendicular to gravity). The vial 616 includes circumscribed marker rings or indicator lines (similar to marker rings 756 of FIG. 19) that are equidistant from and parallel to the maximum diameter 672 and positioned such that when the bubble 676 is between the marker rings the bubble 676 is generally centered on the maximum diameter 672, and thus the vial 616 is parallel to true horizontal. An interface between the bubble 676 and the liquid 680 forms a meniscus 684 defining a discrete perimeter of the bubble 676.

Figure 15:
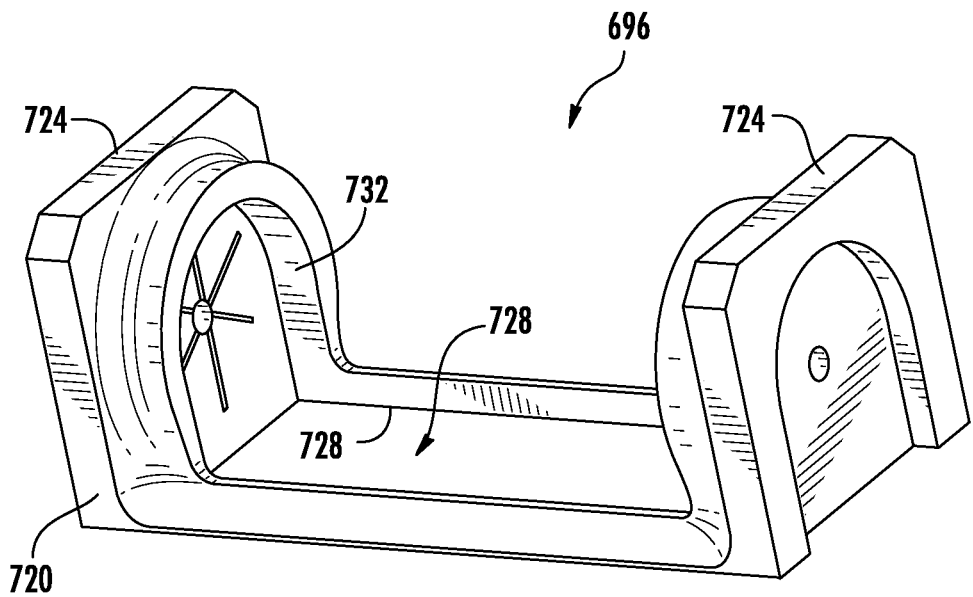
FIG. 15 is a perspective view of an inner vial surround of the vial assembly of FIG. 14.
Figure 18:
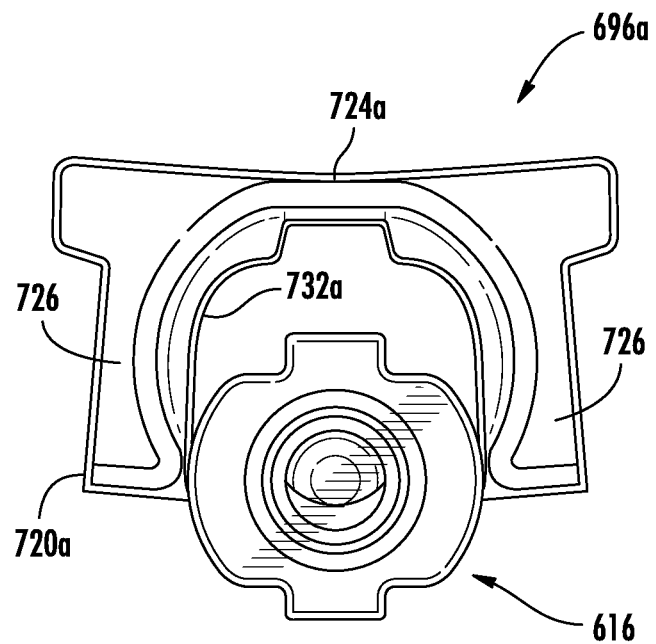
FIG. 18 is an end view of an inner vial surround and a vial.

With reference to FIGS. 14-15, the vial assembly 612 further includes an outer vial surround 692 and an inner vial surround 696 for supporting the vial 616 on the frame body 604 of the level 600. The inner vial surround 696 has a generally U-shaped body 720 having opposing end vial supports 724 that define vial support recesses 732 that hold and support the first and second ends 664, 668 of the vial 616 (FIG. 14). The body 720 defines a bottom opening 728 extending longitudinally between the opposing end vial supports 724. In an alternate embodiment of the inner vial surround 696a, as shown in FIG. 18, the vial support recesses 732a extend through the opposing end vial supports 724 such that the vial support recesses 732a define openings that are continuous with the bottom opening 728a. The end vial supports 724a of the body 720a are provided with resilient flexibility so that opposing halves 726 of the end vial supports 724a flex outwardly away from each other when the vial 616 is inserted through the bottom opening 728a. Once the vial 616 is fully inserted, such that first and second ends 664, 668 are received by the vial support recesses 732a, the end vial supports 724a spring back to hold the vial 616 within the inner vial surround 696a. In some embodiments, the inner vial surround 696a is translucent.

Figure 16:
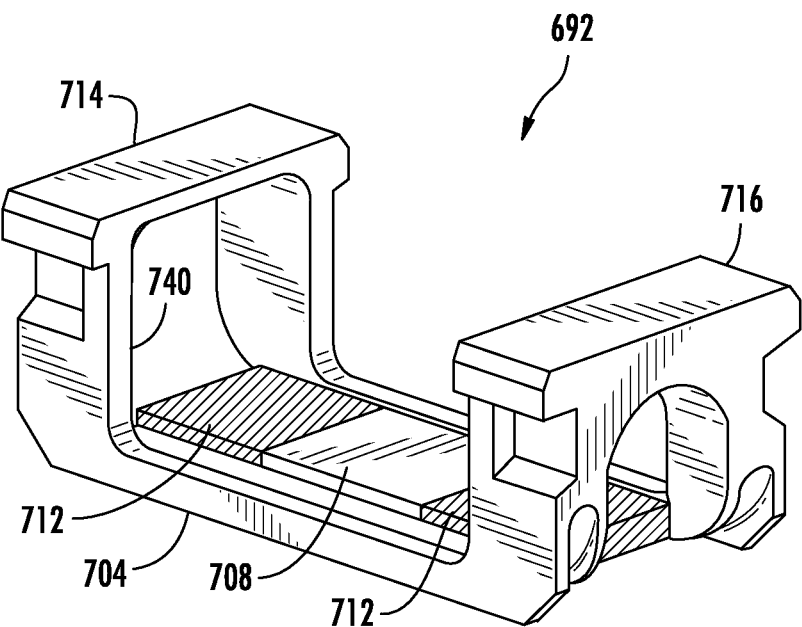
FIG. 16 is a perspective view of an outer vial surround of the vial assembly of FIG. 14.

With reference to FIGS. 14 and 16, the outer vial surround 692 includes a flat base 704, and first and second outer support projections 714, 716 extending from opposite ends of the flat base 704. The base 704 includes an upper surface that faces vial 616 (see FIG. 17), and this upper surface includes a middle portion 708 and a pair of outer portions 712 adjacent each side of the middle portion 708. The middle portion 708 is a light color, such as white or another light color. The outer portions 712 are a dark color, such as black or another dark color.

The outer vial surround 692 may be made from a two-shot injection molding process so that the middle portion 708 is light colored and the outer portions 712 are dark colored. In alternative embodiments, the outer vial surround 692 may be formed from a single colored material and the middle portion 708 and/or the outer portions 712 are coated or layered with their respective desired colors. In further alternative embodiments, the middle portion 708 and the outer portions 712 are made from different colored materials in order to obtain the respective light and dark colors of the middle portion 708 and outer portions 712 and then are coupled together to form the multicolored outer vial surround 692. The middle portion 708 and the outer portions 712 generally divide the base 704 into thirds longitudinally along the base 704.

With continued reference to FIGS. 14-16, the first outer support projection 714 of the outer vial surround 692 defines a vial receiving opening 740 that is sized to slidingly receive the inner vial surround 696 axially along the longitudinal axis A of the vial 616 and support the inner vial surround 696 and the vial 616 on the base 704 of the outer vial surround 692. The bottom opening 728 of the inner vial surround 696 is aligned over the base 704 such that the middle portion 708 and the outer portions 712 of the base 704 can be viewed through the vial 616. The middle portion 708 is centered on the bubble 676 and the outer portions 712 are adjacent the first and second ends 664, 668 of the vial 616. In some embodiments, the level 600 may not include an inner vial surround 696, instead the vial 616 is supported directly by the outer vial surround 692.

With reference to FIGS. 13 and 17, the center vial surround assembly 612 is received within the frame cutout 632 and the interior support cutout 634 in the interior support structure 608. The center vial surround assembly 612 is secured to interior support structure 608 and the frame body 604 using adhesive, such as epoxy. In alternate embodiments, the center vial surround assembly 612 may be secured to the frame body 604 by fasteners or any other suitable manner of securing the center vial surround assembly 612 to the frame body 604.

Presence of dark-colored outer portions 712 creates regions adjacent vial 616 with decreased light reflection (resulting in the darker color) as compared to central area 708, to other parts of the level, to the surrounding environment, etc. Thus, in use, when viewing the vial 616, the relatively low levels of light from the dark-colored outer portions 712 of the base 704 of the outer vial surround 692 reflects off and refracts through the meniscus 684 of the bubble 676 to darken at least a portion of the perimeter of the bubble 676. In particular, opposing longitudinal end portions 748 of the bubble 676 are darkened by reflected light from the dark-colored outer portions 712 of the base 704 (similar to FIG. 19). Thus, the alternating dark and light colored sections of the upper surface of outer vial surround 692 provide improved visibility of the position of the meniscus 684 of the bubble 676 within the vial 616; and specifically, improved visibility of the end portions 748 of the bubble 676 relative to the corresponding adjacent marker rings.

In addition, the light-colored middle portion 708 of the base 704 provides a light-colored background for the darkened end portions 748 of the bubble 676 to contrast against, further improving visibility of the bubble 676. In particular, the light-colored middle portion 708 provides improved contrast and visibility when the viewer views the vial 616 from a position directly above the level 600 so that the light-colored middle portion 708 of the base 704 is positioned beneath the bubble 676 such that the darkened end portions 748 contrasts with the light-colored middle portion 708 to improve visibility of the bubble 676. In addition, corresponding interfaces where the light-colored middle portion 708 meets the dark-colored outer portions 712 may be aligned with the marker rings on the vial 616 so as to provide improved delineation and contrast to more easily determine if the bubble 676 is centered within the vial 616. Accordingly, the viewer can more accurately determine if the bubble 676 is positioned centrally within the vial 616 between the marker rings (i.e., the vial is oriented parallel to true horizontal). In some embodiments, the entire perimeter of the bubble 676 may be darkened for improved contrast and visibility.

In addition, central portion 708 may be sized such that the transitions between the light colored central portion 708 and the dark colored outer portions 712 are positioned near the ends of the indicating bubble 676. As noted, this positioning provides for high contrast along ends 748 of bubble 676. Specifically, as shown in FIG. 17, bubble 676 has a length, L3, in a direction parallel to the longitudinal axis of the level body and of the reference surface that is between 75% and 125% of the length of central portion 708, L4, in the same direction In specific embodiments, the different darkness levels of outer sections 712 and central section 708 is relatively large and can be expressed in terms of the Munsell color system. In specific embodiments, the lighter color of central section 708 has a Munsell color value greater than the Munsell color value of the darker outer sections 712. In a specific embodiment, the lighter color of central section 708 has a Munsell color value of greater than or equal to 8, and the Munsell color value of the darker outer sections 712 is less than 3.

Figure 19:
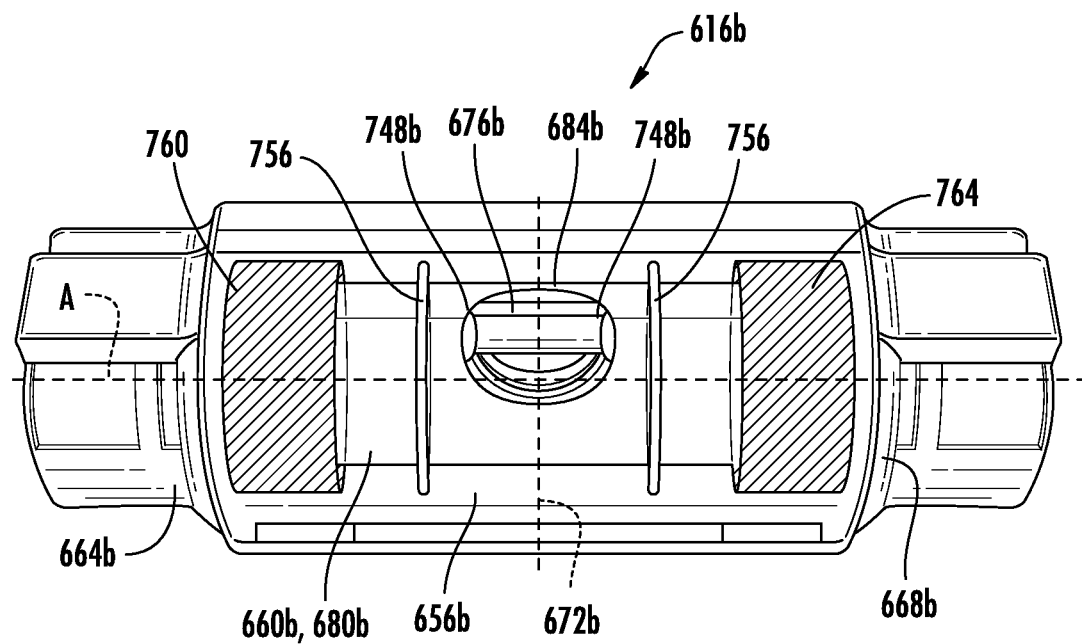
FIG. 19 illustrates a top perspective view of a vial.

FIG. 19 illustrates another vial 616b that, with the exception of some minor distinctions, is substantially similar to the vial 616 of FIGS. 13-17 and may be used in its place with the level 600. Like components and features are identified with like reference numerals plus the letter "b" and will not be described again in detail. Only differences between the two vials will be described in detail.

The vial 616b includes circumscribed marker rings or indicator lines 756 that are equidistant from and parallel to the maximum diameter 672b and positioned such that when the bubble 676b is between the marker rings 756 the bubble 676b is generally centered on the maximum diameter 672b, and thus the vial 616 is parallel to true horizontal. The vial 616b further includes first and second dark-colored bands 760, 764 circumscribing the cavity 660b of the vial 616b. The first dark-colored band 760 is positioned between the maximum diameter 672b and the first end 664b of the vial 616b. The second dark-colored band 764 is positioned between the maximum diameter 672b and the second end 668b of the vial 616b. In the illustrated embodiment, the dark-colored bands 760, 764 are black, but may be any dark color, and may be opaque or translucent. The portion of the vial body 656 between the first and second dark-colored bands 760, 764 is unobstructed and translucent so as to clearly see the bubble 676b through the vial body 656. When viewing the vial 616b, the dark-colored bands 760, 764 function similarly to the dark-colored outer portions 712 of the base 704 to reflect light so as to reflect off or refract through the meniscus 684b of the bubble 676b to darken at least a portion of the perimeter of the bubble 676b, thereby further improving contrast between the meniscus 684b and the liquid 680b. In particular, the end portions 748b of the bubble 676b are darkened by reflected light from the dark-colored outer portions 712. The vial 616b including the dark-colored bands 760, 764 may be used alone or in conjunction with the dark-colored outer portions 712 of the base 704 of the outer vial surround 692. In some embodiments, each of the dark-colored bands 760, 764 are arranged to directly align above a corresponding one of the dark-colored outer portions 712 of the base 704 so as to further enhance the darkness of the darkened portion of the bubble 676b to provide improved contrast between the darkened portion of the bubble 676b, and the liquid 680 and/or the light-colored middle portion 708.

Figure 20:
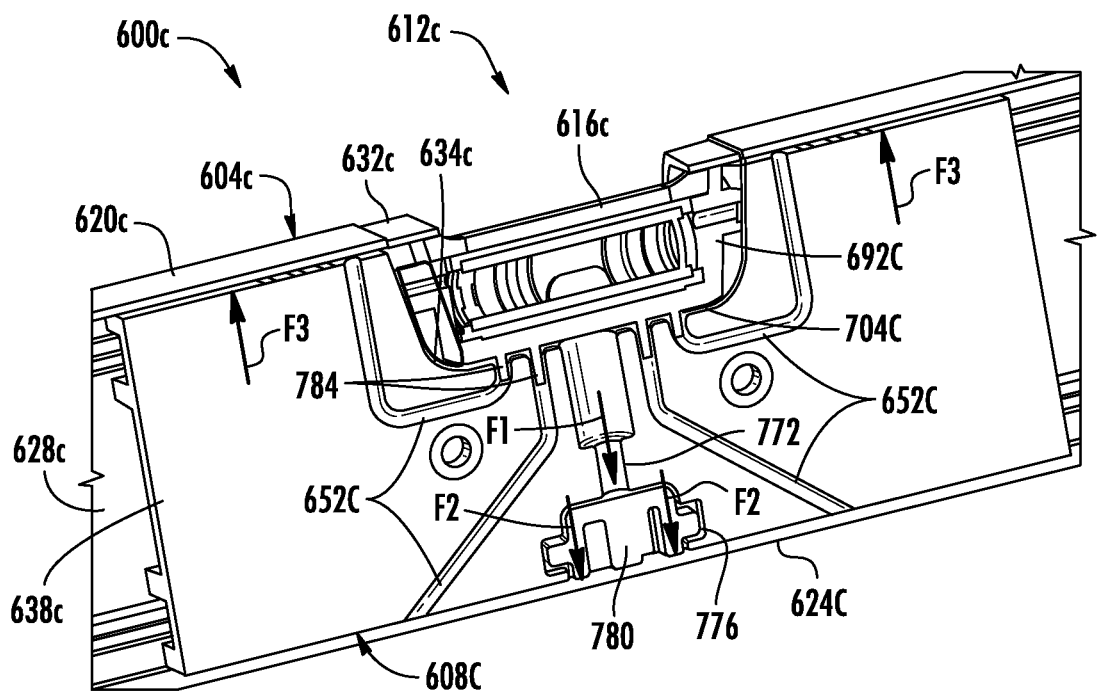
FIG. 20 is an enlarged cross-sectional perspective view of a level.

FIG. 20 illustrates another level 600c that, with the exception of some minor distinctions, is substantially similar to the level 600 of FIGS. 13-17. Like components and features are identified with like reference numerals plus the letter "c" and will not be described again in detail. Only differences between the two embodiments will be described in detail.

The interior support structure 608c further defines a bore 772 extending from the interior support cutout 634c toward the bottom planar wall 624c into a cavity 776 sized to receive a standoff member 780. The bore 772 is threaded so as to receive a threaded fastener (not shown). In addition, the outer vial surround 692c includes projections 784 extending downward from the base 704c that are received within the adhesive passageways 652c.

During assembly of the level 600c, the threaded fastener is threaded into the bore 772 so as to apply a downward force F1 on the standoff member 780, thereby urging the standoff member 780 into contact with the bottom planar wall 624c. Continuing to thread the threaded fastener through the bore 772 causes the standoff member 780 to apply a downward force F2 on the bottom planar wall 624c, thereby driving the interior support structure 608c upward into contact with the top planar wall 620c to apply an upward force F3 on the top planar wall 620c. The downward force F2 applied on the bottom planar wall 624c by the standoff member 780 and the upward force F3 applied on the top planar wall 620c securely clamps the interior support structure 608c within the frame body 604c of the level 600c. Adhesive may then be injected through the adhesive passageways 652c to permanently secure the interior support structure 608c to the frame body 604c. The center vial assembly 612c may then be inserted into the interior support cutout 634c, such that the projections 784 are received within the adhesive passageways 652c so as to secure the center vial assembly 612c in place on the level 600c via the adhesive.

In some embodiments, a light source (e.g., an LED) is positioned adjacent each of the first and second ends 664, 668 of the vial 616 (or the vials 616b, 616c of FIGS. 19 and 20) to provide illumination within the vial 616. The light sources emit light that reflects off the dark-colored outer portions 712 of the outer vial surround 692 (or the dark-colored bands 760, 764 of FIG. 19), and then either reflects off, or refracts through, the meniscus 684 of the bubble 676 to further increase the darkness of the meniscus 684 to provide improved contrast and visibility of the bubble within the vial 616.

Although the invention has been described in detail with reference to certain preferred embodiments, variations and modifications exist within the scope and spirit of one or more independent aspects of the invention as described. For example, features of each of the vials 100, 200, 300, 400, 500, 616b, and vial assembly 612 may be combined in any viable combination to obtain a vial or vial assembly with any combination of the various features, as described above.

What is claimed is:

1. A level comprising:
   a level body defining a planar base surface configured to engage a workpiece;
   a vial supported by the level body and including an inner surface defining a cavity;
   a first material located within the cavity of the vial, wherein the first material is a liquid material;
   a second material located within the cavity of the vial, the second material forms an indicator within the first material such that an interface is defined between the first and second materials; and a third material located within the cavity of the vial, the third material having a polarity that attracts the third material to the interface between the first material and the second material.

2. The level of claim 1, wherein the second material is air, and the third material has a density that is less than a density of the first material such that the third material floats on the first material and is located between the first material and the second material.

3. The level of claim 1, wherein the first material is a polar material and the third material is a nonpolar material or the first material is a nonpolar material and the third material is a polar material.

4. The level of claim 1, wherein the third material is an amphipathic material.

5. The level of claim 4, wherein the first material is a nonpolar liquid and the second material a polar liquid or the first material is a polar liquid and the second material a nonpolar liquid.

6. The level of claim 1, wherein third material has an optical property that is different from an optical property of the first material and from an optical property of the second material.

7. The level of claim 6, wherein the third material has a light transmittance at a wavelength of between 390 nm to 700 nm that is greater than a light transmittance at the wavelength of the first material.

8. The level of claim 1, wherein the third material returns back to the interface between the first and second materials in less than 3 seconds when the level is dropped from a horizontal position to the ground from a height of four feet.

9. The level of claim 1, further comprising a vial surround mounted to the level body and engaging the vial such that the vial is supported in the level body via the vial surround, wherein the vial surround has a surface facing the vial, the surface comprising a central portion facing a central portion of the vial, a first end portion facing a first end of the vial and a second end portion facing a second end of the vial opposite the first end, wherein central portion of the vial surround surface has a first color, the first end portion of the vial surround surface has a second color, and the second end portion of the vial surround surface has a third color, wherein the first color has a Munsell color value greater than Munsell color values of both the second color and the third color.

10. The level of claim 9, wherein the indicator includes a first length in a direction parallel to a longitudinal axis of the planar base surface, wherein the central portion of the vial surround surface includes a second length measured in a direction parallel to the first length, wherein the second length is between 75% and 125% of the first length.

* * * * *